(12) United States Patent
Liu

(10) Patent No.: US 11,706,483 B2
(45) Date of Patent: Jul. 18, 2023

(54) VIDEO PLAYING METHOD AND APPARATUS, AND ELECTRONIC DEVICE

(71) Applicant: HONG KONG LIVEME CORPORATION LIMITED, Hong Kong (CN)

(72) Inventor: Wei Liu, Beijing (CN)

(73) Assignee: JOYME PTE. LTD., Singapore (SG)

( * ) Notice: Subject to any disclaimer, the term of this patent is extended or adjusted under 35 U.S.C. 154(b) by 323 days.

(21) Appl. No.: 16/753,129

(22) PCT Filed: Aug. 2, 2018

(86) PCT No.: PCT/CN2018/098268
§ 371 (c)(1),
(2) Date: Apr. 2, 2020

(87) PCT Pub. No.: WO2019/109650
PCT Pub. Date: Jun. 13, 2019

(65) Prior Publication Data
US 2020/0296453 A1  Sep. 17, 2020

(30) Foreign Application Priority Data

Dec. 6, 2017  (CN) .......................... 201711276266.9

(51) Int. Cl.
*H04N 21/44* (2011.01)
*H04N 21/4408* (2011.01)
*H04N 21/845* (2011.01)

(52) U.S. Cl.
CPC . *H04N 21/44012* (2013.01); *H04N 21/44008* (2013.01); *H04N 21/4408* (2013.01); *H04N 21/8456* (2013.01)

(58) Field of Classification Search
CPC ....... H04N 21/42607; H04N 21/42653; H04N 21/44008; H04N 21/44012; H04N 21/4408; H04N 21/8456; H04N 5/76; H04N 5/783
(Continued)

(56) References Cited

U.S. PATENT DOCUMENTS

2005/0123044 A1\* 6/2005 Katsavounidis ..... H04N 21/236
375/240.12
2011/0185058 A1\* 7/2011 Priddle ................ H04N 21/454
709/224
(Continued)

FOREIGN PATENT DOCUMENTS

CN  103139636 A  6/2013
CN  104616243 A  5/2015
(Continued)

OTHER PUBLICATIONS

International Search Report for International Application No. PCT/CN2018/098268 dated Nov. 6, 2018.

*Primary Examiner* — Nasser M Goodarzi
*Assistant Examiner* — Jaycee Imperial
(74) *Attorney, Agent, or Firm* — Suiter Swantz pc llo

(57) ABSTRACT

A video playing method, apparatus and electronic device. The method comprises: obtaining to-be-played video frames; inputting the obtained to-be-played video frames into a preset decoder, and decoding the to-be-played video frames by the preset decoder to obtain decoded to-be-played video frames; storing the decoded to-be-played video frames as texture data in a texture storage area of a graphic processing unit; determining, from the decoded to-be-played video frames stored in the texture storage area, a decoded to-be-played video frame that satisfies a rendering condition as a to-be-rendered video frame; rendering and the determined to-be-rendered video frames by the graphic process-
(Continued)

ing unit and playing the rendered video frame. With the embodiments of the present application, rendering speed of a graphic processing unit (GPU) can be increased to a certain extent. Therefore, video playing performance of the electronic device can be improved.

12 Claims, 5 Drawing Sheets

(58) Field of Classification Search
USPC .......................................................... 725/32
See application file for complete search history.

(56) References Cited

U.S. PATENT DOCUMENTS

| | | | |
|---|---|---|---|
| 2013/0031216 A1* | 1/2013 | Willis | H04L 67/02 |
| | | | 709/219 |
| 2013/0247091 A1* | 9/2013 | Wong | H04N 5/76 |
| | | | 725/32 |
| 2015/0206269 A1* | 7/2015 | Qin | G06T 1/20 |
| | | | 725/112 |
| 2016/0057382 A1* | 2/2016 | Yang | H04N 21/43637 |
| | | | 348/558 |
| 2016/0308791 A1* | 10/2016 | Subasingha | H04L 49/90 |
| 2017/0311006 A1* | 10/2017 | Yang | H04N 21/234 |
| 2017/0329395 A1* | 11/2017 | Flordal | G06T 11/001 |

FOREIGN PATENT DOCUMENTS

| | | |
|---|---|---|
| CN | 106127673 A | 11/2016 |
| CN | 106210883 A | 12/2016 |
| CN | 106598739 A | 4/2017 |
| CN | 106961628 A | 7/2017 |
| CN | 107277616 A | 10/2017 |
| CN | 107948735 A | 4/2018 |

* cited by examiner

VIDEO PLAYING METHOD AND APPARATUS, AND ELECTRONIC DEVICE

The present application claims the priority to Chinese patent application No. 201711276266.9, filed with the China National Intellectual Property Administration on Dec. 6, 2017 and entitled "Video playing method, apparatus, and electronic device", which is incorporated herein by reference in its entirety.

TECHNICAL FIELD

The present application relates to the field of video playing technology, and in particular, to a video playing method, apparatus, and electronic device.

BACKGROUND

Decoding and rendering processes are typically involved in video play back by an electronic device. Specifically, to-be-played video frames are first decoded by a decoder to obtain decoded video frames, which are to be stored in Random-Access Memory (RAM). When rendering decoded video frames, a Graphic Processing Unit (GPU) first obtains the decoded video frames from RAM, and then render the decoded video frame. The rendered video frames are then played.

In the above conventional video playing process, decoded video frames are stored in a RAM. As a result, to fulfill the subsequent rendering process, the GPU needs to communicate with the RAM, that is, obtain the decoded video frames from the RAM. The communication process consumes GPU resources and would have influence on the rendering speed of the GPU. Video playing performance of an electronic device is thus degraded.

SUMMARY

The purpose of the embodiments of the present application is to provide a video playing method, apparatus and electronic device, so as to improve GPU rendering speed to a certain extent and further improve the video playing performance of the electronic device. Further, the technical solutions are described as follows.

In an aspect, an embodiment of the present application provides a video playing method, including:

obtaining to-be-played video frames;

inputting the obtained to-be-played video frames into a preset decoder, and decoding the to-be-played video frames by the preset decoder to obtain decoded to-be-played video frames;

storing the decoded to-be-played video frames as texture data in a texture storage area of a graphic processing unit;

determining, from the decoded to-be-played video frames stored in the texture storage area, a decoded to-be-played video frame that satisfies a rendering condition as a to-be-rendered video frame; and rendering the determined to-be-rendered video frame by the graphic processing unit and playing the rendered video frame.

Optionally, the rendering condition is that, the decoded to-be-played video frame has the earliest timestamp among timestamps that are subsequent to a timestamp for an audio frame that is currently being played.

Optionally, before obtaining to-be-played video frames, the method further includes:

determining whether a first jump instruction is received, wherein the first jump instruction is an instruction for instructing a direct jump of video playing, and the first jump instruction contains a first moment to which the video playing is required to jump; and when it is determined that the first jump instruction is received, notifying the preset decoder to discard currently obtained video frames.

Further, after determining that the preset decoder has discarded the currently obtained video frames, the operation of obtaining to-be-played video frames includes:

obtaining, from a target video file, a video frame having a timestamp corresponding to the first moment contained in the first jump instruction as a to-be-played video frame.

Optionally, when it is determined that the first jump instruction is not received, obtaining to-be-played video frames includes:

obtaining, from the target video file, to-be-played video frames in a chronological order based on timestamps for all video frames.

Optionally, before obtaining to-be-played video frames, the method further includes:

determining whether a second jump instruction is received, wherein the second jump instruction is an instruction for instructing the preset decoder to complete decoding of currently obtained video frames and then to perform a jump of video playing, and the second jump instruction contains a second moment to which the video playing is required to jump;

after determining that the second jump instruction is received, constructing a useless video frame as a useless frame;

inputting circularly the constructed useless video frame into the preset decoder, and decoding the currently obtained video frames and the useless video frame through the preset decoder; and stopping the input of the constructed useless video frame into the preset decoder once a decoded useless video frame is obtained or a target video frame is obtained, wherein the target video frame is a video frame with the largest timestamp among the currently obtained video frames.

Further, the operation of obtaining to-be-played video frames includes:

obtaining, from a target video file, a video frame having a timestamp corresponding to the second moment contained in the second jump instruction as a to-be-played video frame.

Optionally, constructing a useless video frame as a useless frame includes:

obtaining a key video frame; and modifying a timestamp for the key video frame based on a timestamp for the target frame to obtain a useless video frame as the useless frame.

Optionally, the timestamp includes a display timestamp and a decoding timestamp.

The operation of modifying a timestamp for the key video frame based on a timestamp for the target frame to obtain a useless video frame as the useless frame includes:

using a sum of a display timestamp for the target video frame and a first preset duration as a display timestamp for the key video frame;

using a sum of a decoding timestamp for the target video frame and a second preset duration as a decoding timestamp for the key video frame.

In another aspect, an embodiment of the present application provides a video playing apparatus, including:

an obtaining module, configured for obtaining to-be-played video frames;

a first input decoding module, configured for inputting the obtained to-be-played video frames into a preset decoder, and decoding the to-be-played video frames by the preset decoder to obtain decoded to-be-played video frames;

a storage module, configured for storing the decoded to-be-played video frames as texture data in a texture storage area of a graphic processing unit;

a determining module, configured for determining, from the decoded to-be-played video frames stored in the texture storage area, a decoded to-be-played video frame that satisfies a rendering condition as a to-be-rendered video frame; and a rendering and playing module, configured for rendering the determined to-be-rendered video frame by the graphic processing unit and playing the rendered video frame.

Optionally, the rendering condition is that, the decoded to-be-played video frame has the earliest timestamp among timestamps that are subsequent to a timestamp for an audio frame that is currently being played.

Optionally, the apparatus further includes a first judging module and a notification module.

The first judging module is configured for, before obtaining to-be-played video frames, determining whether a first jump instruction is received, wherein the first jump instruction is an instruction for instructing a direct jump of video playing, and the first jump instruction contains a first moment to which the video playing is required to jump.

The notification module is configured for notifying, when it is determined that the first jump instruction is received, notifying the preset decoder to discard currently obtained video frames.

After determining that the preset decoder has discarded the currently obtained video frames, the obtaining module is further configured for:

obtaining, from a target video file, a video frame having a timestamp corresponding to the first moment contained in the first jump instruction as a to-be-played video frame.

Optionally, when it is determined that the first jump instruction is not received, the obtaining module is further configured for:

obtaining, from the target video file, to-be-played video frames in a chronological order based on timestamps for all video frames.

Optionally, the apparatus further includes a second judging module, a constructing module, a second input decoding module and a stopping module.

The second judging module is configured for, before obtaining to-be-played video frames, determining whether a second jump instruction is received, wherein the second jump instruction is an instruction for instructing the preset decoder to complete decoding of currently obtained video frames and then to perform a jump of video playing, and the second jump instruction contains a second moment to which the video playing is required to jump.

The constructing module is configured for constructing, after determining that the second jump instruction is received, a useless video frame as a useless frame.

The second input decoding module is configured for inputting circularly the constructed useless video frame into the preset decoder, and decoding the currently obtained video frames and the useless video frame through the preset decoder.

The stopping module is configured for stopping the input of the constructed useless video frame into the preset decoder once a decoded useless video frame is obtained or a target video frame is obtained, wherein the target video frame is a video frame with the largest timestamp among the currently obtained video frames.

The obtaining module is further configured for:

obtaining, from a target video file, a video frame having a timestamp corresponding to the second moment contained in the second jump instruction as a to-be-played video frame.

Optionally, the constructing module includes a obtaining unit and a modification constructing unit.

The obtaining unit is configured for obtaining a key video frame.

The modification constructing unit is configured for modifying a timestamp for the key video frame based on a timestamp for the target frame to obtain a useless video frame as the useless frame.

Optionally, the timestamp includes a display timestamp and a decoding timestamp.

The modification constructing unit is further configured for:

using a sum of a display timestamp for the target video frame and a first preset duration as a display timestamp of the key video frame; and using a sum of a decoding timestamp for the target video frame and a second preset duration as a decoding timestamp of the key video frame.

On the other hand, an embodiment of the present application provides an electronic device including a processor, a communication interface, a memory, a communication bus, and a display, wherein the processor, the communication interface, the memory and the display communicate with each other via the communication bus.

The memory is configured for storing computer programs;

The processor is configured for executing the computer program stored in the memory so as to implement operations of the video playing method provided in embodiments of the present application.

The display is configured for displaying rendered video frames.

In another aspect, an embodiment of the present application provides a computer readable storage medium having computer programs stored thereon which, when executed by a processor, cause the processor to implement any of the video playing methods provided in embodiments of the present application.

In another aspect, an embodiment of the present application provides a computer program which, when executed by a processor, causes the processor to implement any of the video playing methods provided in embodiments of the present application.

In the embodiment of the present application, to-be-played video frames are obtained and input into a preset decoder so as to be decoded by the preset decoder; decoded to-be-played video frames as obtained are stored as texture data in a texture storage area of a graphic processing unit; a decoded to-be-played video frame that satisfies a rendering condition is determined, from the decoded to-be-played video frames stored in the texture storage area, as a to-be-rendered video frame, which is then rendered by the graphic processing unit and played.

In the embodiment of the present application, decoded to-be-played video frames are stored as texture data in a texture storage area of a graphic processing unit. When a graphic processing unit is used to render the decoded to-be-played video frames, a decoded to-be-played video frame that satisfies a rendering condition can be obtained directly and locally from the graphic processing unit for rendering. It is thus not necessary to communicate with Random-Access Memory (RAM). As a result, more resources of the graphic processing unit may be used for rendering of video frames. This can improve somewhat the rendering speed and rendering efficiency for the graphic processing unit to render video frames during video playing process, thereby improving the video playing performance of the electronic device. It should be understood that any product or method for implementing the embodiments of the present disclosure does not necessarily require all of the advantages described above.

BRIEF DESCRIPTION OF THE DRAWINGS

In order to more clearly describe the technical solution of the embodiments of the application or of the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

The technical solution of the application will be described in detail with reference to the drawings of embodiments of the present application. Obviously, the embodiments described are only some instead of all of the embodiments of the present application. All other embodiments obtained by those of ordinary skills in the art based on the embodiments herein without any creative efforts are within the scope of the present application.

The embodiments of the present application provide a video playing method, apparatus and electronic device that can improve GPU rendering speed and in turn improve the video playing performance of an electronic device.

Figure 1:
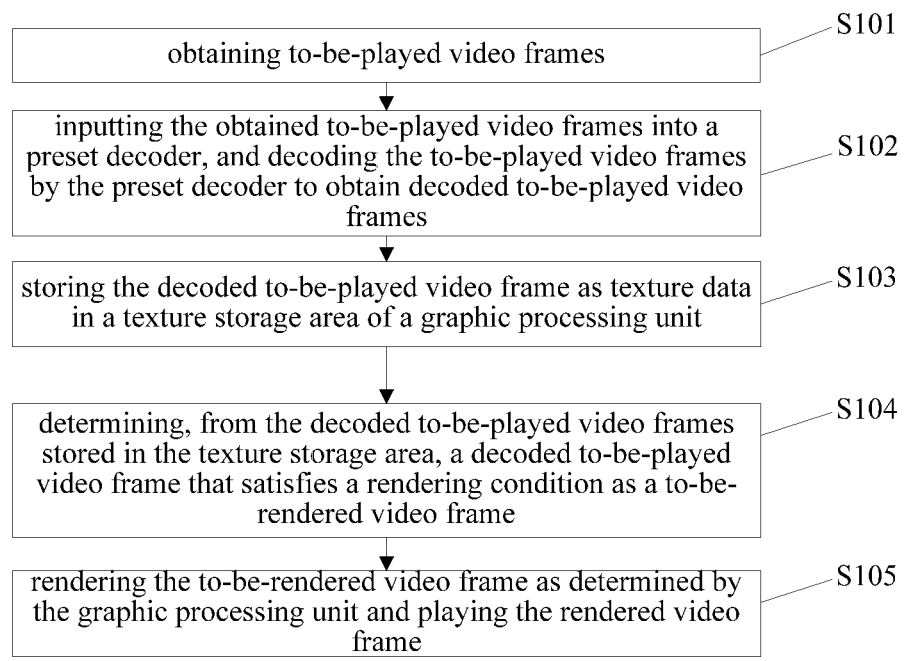
FIG. 1 is a schematic flow chart of a video playing method according to an embodiment of the present application.

As shown in FIG. 1, an embodiment of the present application provides a video playing method. The method may include the following operations.

S101: obtaining to-be-played video frames;

It may be understood that the video playing method provided in the embodiments of the present application can be applied to any electronic device capable of video playing, for example, a computer, a smart phone, or the like.

In one case, a functional software in which the video playing method provided by the embodiment of the present application is embodied may be a specialized client software, such as a video player client software, or a plug-in of a client software capable of video playing, by way of example but not limitation.

After determining a video file to be played or being played, the electronic device may directly obtain to-be-played video frames from the video file. In the embodiment of the present application, the electronic device may obtain one video frame or multiple consecutive video frames from the video file as to-be-played video frames. There is no limitation in this. The multiple consecutive video frames may be video frames with consecutive timestamps in the video file.

The video file may have a form of Audio Video Interleaved (AVI), RMVB, RM or MP4. Embodiments are not limited in this aspect.

S102: inputting the obtained to-be-played video frames into a preset decoder, and decoding the to-be-played video frames by the preset decoder to obtain decoded to-be-played video frames.

In one case, the preset decoder may be a hardware decoder. In one implementation, the hardware decoder may be MEDIACODE.

In one implementation, the electronic device inputs the obtained to-be-played video frames into a preset decoder so as to be decoded thereby. After decoding the to-be-played video frames, the preset decoder would output decoded to-be-played video frames. It may be understood that in an example, the preset decoder may output the decoded to-be-played video frames into Surface Texture. The electronic device may periodically read, from the Surface Texture, the decoded to-be-played video frames output by the preset decoder, so as to obtain decoded to-be-played video frames.

In a case where multiple to-be-played video frames are obtained by the electronic device, the electronic device may input the to-be-played video frames into the above preset decoder in chronological order based on timestamps for the to-be-played video frames.

S103: storing the decoded to-be-played video frame as texture data in a texture storage area of a Graphic Processing Unit (GPU).

In the embodiment of the present application, after obtaining decoded to-be-played video frames, the electronic device may directly store the decoded to-be-played video frames as texture data in a texture storage area of a graphic processing unit. In one implementation, the electronic device may store the decoded to-be-played video frames as texture data in the texture storage area of the graphic processing unit, in a chronological order based on timestamps for the decoded to-be-played video frames.

In one implementation, the decoded to-be-played video frames as obtained may be cached as texture data in the texture storage area of graphic processing unit.

S104: determining, from the decoded to-be-played video frames stored in the texture storage area, a decoded to-be-played video frame that satisfies a rendering condition as a to-be-rendered video frame.

In one case, the electronic device may have a reading thread, and a rendering thread which is to be triggered each time the reading thread reads a decoded to-be-played video frame output by the preset decoder, so as to determine, from the decoded to-be-played video frames stored in the text storage area, a decoded to-be-played video frame that satisfies the rendering condition as a video frame to be rendered in subsequent rendering process.

The electronic device may fail to read, periodically or non-periodically with the reading thread, decoded to-beplayed video frames output by the preset decoder due to the fact that the preset decoder may need some time to decode video frames. Each time the electronic device reads a decoded to-be-played video frame with the above reading thread, the decoded to-be-played video frame is stored as texture data in the texture storage area of the graphic processing unit.

In one case, the electronic device may trigger a rendering thread anyway, regardless of its success or failure of reading decoded to-be-played video frames, to determine a to-be-rendered video frame by the rendering thread and render the to-be-rendered video frame. That is, when the electronic device obtains a decoded to-be-played video frame through the reading thread, the electronic device determines, from decoded to-be-played video frames stored in the texture storage area, a decoded to-be-played video frame that satisfies a rendering condition as a to-be-rendered video frame; when the electronic device does not obtain a decoded to-be-played video frame through the reading thread, the electronic device also determines, from decoded to-be-played video frames stored in the texture storage area, a decoded to-be-played video frame that satisfies a rendering condition as a to-be-rendered video frame.

In theory, the decoding of a video frame is generally faster than the rendering thereof. Therefore, the storage of decoded to-be-played video frames in the texture storage area can ensure that the electronic device is able to determine decoded to-be-played video frames that satisfy a rendering condition with the above rendering thread. These video frames are determined as video frames to be rendered for subsequent rendering.

S105: rendering the to-be-rendered video frame as determined by the graphic processing unit and playing the rendered video frame.

In the embodiment of the present application, the electronic device renders to-be-rendered video frames as determined through a graphic processing unit, and transmits the rendered video frames to a display of the electronic device, so that the rendered video frames are played through the display.

In the embodiment of the present application, decoded to-be-played video frames are stored as texture data in a texture storage area of a graphic processing unit. When a graphic processing unit is used to render the decoded to-be-played video frames, a decoded to-be-played video frame that satisfies a rendering condition can be obtained directly and locally from the graphic processing unit for rendering. It is thus not necessary to communicate with Random-Access Memory (RAM). As a result, more resources of the graphic processing unit may be used for rendering of video frames. This can improve somewhat the rendering speed and rendering efficiency for the graphic processing unit to render video frames during video playing process, thereby improving the video playing performance of the electronic device.

In addition, in the embodiment of the present application, decoded to-be-played video frames are directly stored as texture data in a texture storage area of a graphic processing unit instead of RAM. This saves RAM storage space and eliminates need for contention for RAM storage space with other running threads in the electronic device. This solves the problem that an electronic device with low memory shows degraded performance and insufficiency of RAM in playing and editing a video.

In one implementation, the rendering condition is that, the decoded to-be-played video frame has the earliest timestamp among timestamps that are subsequent to a timestamp for an audio frame that is currently being played.

It is understood that, in video playing, an electronic device has to ensure synchronization between audio frames and video frames to avoid mismatch between voice and mouth shape. Since an audio distortion tends to attract the user's attention, in one implementation, the synchronization between audio frames and video frames can be controlled through audio. That is, to-be-played video frames are selected based on audio frames to be played. Since a rendering process takes time, when the electronic device determines a video frame to be rendered, it needs to determine, from the decoded to-be-played video frames stored in the texture storage area, a video frame having the earliest timestamp among timestamps that are subsequent to a timestamp for the audio frame currently being played. For example, when the timestamp for a currently played audio frame is 5 s, a video frame whose timestamp is the earliest among video frames that are no earlier than 5 s may be determined, from the decoded to-be-played video frames stored in the texture storage area, as a to-be-rendered video frame.

In one case, if a video frame in the decoded to-be-played video frames stored in the texture storage area has a timestamp earlier than 5 s, the video frame may be skipped. The determination is only directed to video frames whose timestamps are no earlier than 5 s.

In one implementation, during a normal process of playing a video file, the electronic device may periodically obtain to-be-played video frames in a chronological order based on timestamps for all video frames in the video file being played. The to-be-played video frames are then input into a preset decoder to be decoded. Decoded to-be-played video frames are thus obtained and then stored as texture data in a texture storage area of a graphic processing unit. From the decoded to-be-played video frames stored in the texture storage area, a decoded to-be-played video frame that satisfies a rendering condition may be determined as a video frames to be rendered. This to-be-rendered video frame is rendered by the graphic processing unit a played. The normal process of playing a video file as described above may be applied in a case where no instruction of video playing jump is received.

In an embodiment of the present application, in the process of playing a video file, a user may desire a jump of video playing, such as backward playing, replay or fast forwarding of a video. In one case, playing backward a video may be implemented by playing video frames in reverse order. For example, in forward playing, video frames are played in chronological order based on their timestamps. That is, the video frames are played in a sequence of video frame 1, video frame 2, video frame 3, video frame 4, video frame 5, and video frame 6. While in backward playing, video frames are played in a sequence of video frame 6, video frame 5, video frame 4, video frame 3, video frame 2, and video frame 1. The replay of a video may be a loop playback of a video. For example, multiple video frames are played in loop. The fast forwarding of video playing may be: during the playback of a sequence of video frames, the user fast-forwards the video playing to a position and then starts the playing. For example, when a timestamp for the currently played video frames is 15:00, and the user fast-forwards the video playing to a video frame having a timestamp of 19:00 to start playing. In one implementation, the operations of video playing jump, such as backward playing, replay and fast forwarding may also be automatically triggered by an electronic device according to a preset program.

In the embodiment of the present application, jump of video playing may be needed. In one implementation, a direct jump is required, wherein, to-be-played video frames that have been input into a preset encoder for encoding and decoded to-be-played video frames that are stored in a current texture storage area no longer need to be played, and the video playing would directly jump to a respective video frame. In another implementation, the video playing jumps to a respective video frames after the playing of to-be-played video frames that are currently encoded in the preset encoder and decoded to-be-played video frames that are stored in the current texture storage are completed.

Figure 2:
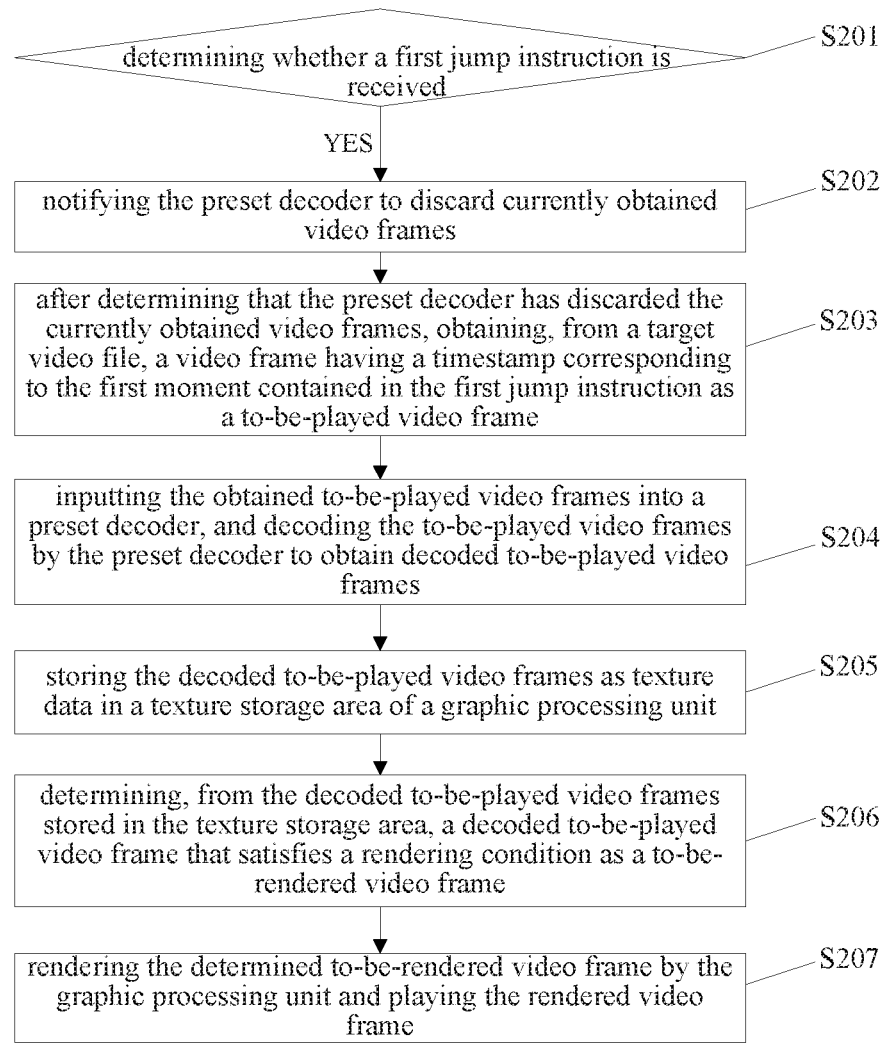
FIG. 2 is another schematic flow chart of a video playing method according to an embodiment of the present application.

As shown in FIG. 2, a video playing method provided in the embodiment of the present application may include the following operations.

S201: determining whether a first jump instruction is received;

The first jump instruction is an instruction for instructing a direct jump of video playing, and the first jump instruction contains a first moment to which the video playing is required to jump.

S202: upon a determination that the first jump instruction is received, notifying the preset decoder to discard currently obtained video frames;

S203: after determining that the preset decoder has discarded the currently obtained video frames, obtaining, from a target video file, a video frame having a timestamp corresponding to the first moment contained in the first jump instruction as a to-be-played video frame;

S204: inputting the obtained to-be-played video frames into a preset decoder, and decoding the to-be-played video frames by the preset decoder to obtain decoded to-be-played video frames;

S205: storing the decoded to-be-played video frames as texture data in a texture storage area of a graphic processing unit;

S206: determining, from the decoded to-be-played video frames stored in the texture storage area, a decoded to-be-played video frame that satisfies a rendering condition as a to-be-rendered video frame; and S207: rendering the determined to-be-rendered video frame by the graphic processing unit and playing the rendered video frame.

The above S204 is the same as S102 shown in FIG. 1, the above S205 is the same as S103 shown in FIG. 1, the above S206 is the same as S104 shown in FIG. 1, and the above S207 is the same as S105 shown in FIG. 1.

In the embodiment of the present application, before obtaining to-be-played video frames, the electronic device may first determine whether a first jump instruction is received. The first jump instruction is an instruction for instructing a direct jump of video playing. That is, to-be-played video frames that have been input into a preset encoder for encoding and decoded to-be-played video frames that are stored in a current texture storage area no longer need to be played, and the video playing would directly jump to a respective video frame. In this case, after determining that the first jump instruction is received, the electronic device may first notify the preset decoder to discard currently obtained video frames. After receiving the notification, the preset decoder discards the currently obtained video frames, and then feeds back discard-completion information. The electronic device may determine, based on the discard-completion information fed back by the above decoder, that the preset decoder has discarded the currently obtained video frames. The device may then obtain a to-be-played video frame according to the first jump instruction. In one case, the process of discarding currently obtained video frames by the preset decoder after receiving the notification may be referred as "flushCodec", and the process of feeding back the discard-completion information by the decoder can be referred to as "notify".

In one case, in order to save storage space of a texture storage area of a graphic processing unit, in the embodiment of the present application, after determining that the first jump instruction is received, the electronic device may also clear decoded to-be-played video frames stored in the texture storage area of the image processor.

It may be understood that the target video file as mentioned above may be a video file currently being played in the electronic device, and the first jump instruction is directed to the target video file. The "currently" refers to the time when the first jump instruction is received, and the currently obtained video frames are to-be-played video frames that have been input into the preset decoder.

In one implementation, the electronic device may determine that the first jump instruction is not received. In this case, the electronic device may play the target video file according in a normal video playing process. Specifically, when the electronic device determines that the first jump instruction is not received, the operation of obtaining to-be-played video frames may include:

obtaining, from the target video file, to-be-played video frames in a chronological order based on timestamps for all video frames.

Figure 3:
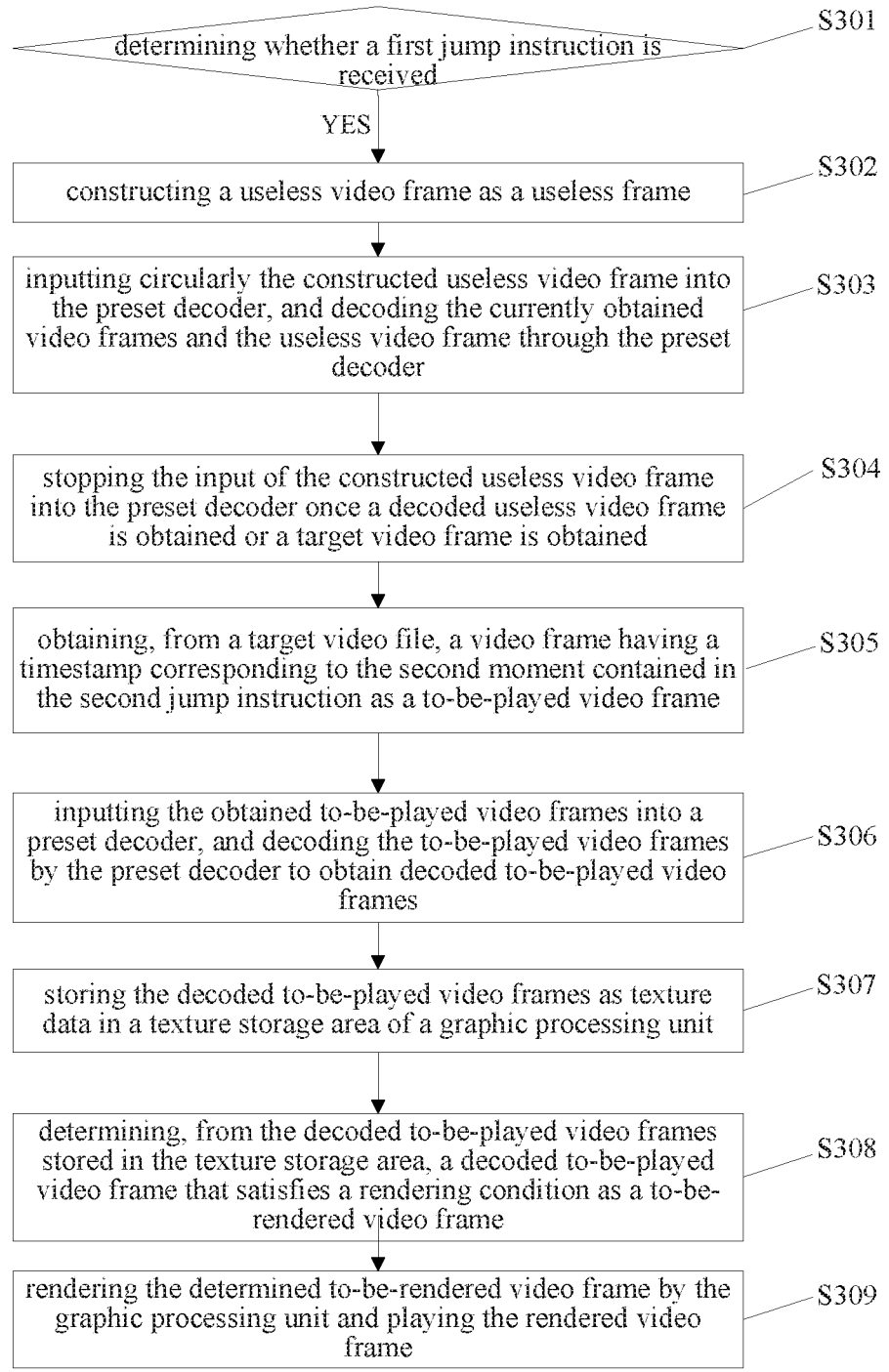
FIG. 3 is another schematic flow chart of a video playing method according to an embodiment of the present application.

In another implementation of the embodiment, jump of video playing is implemented after to-be-played video frames currently being encoded in a preset encoder and decoded to-be-played video frames currently stored in a texture storage area have been played. As shown in FIG. 3, a video playing method provided in the embodiment of the present application may include the following operations.

S301: determining whether a second jump instruction is received.

The second jump instruction is an instruction for instructing the preset decoder to complete decoding of currently obtained video frames and then to perform a jump of video playing, and the second jump instruction contains a second moment to which the video playing is required to jump.

S302: after determining that the second jump instruction is received, constructing a useless video frame as a useless frame.

S303: inputting circularly the constructed useless video frame into the preset decoder, and decoding the currently obtained video frames and the useless video frame through the preset decoder.

S304: stopping the input of the constructed useless video frame into the preset decoder once a decoded useless video frame is obtained or a target video frame is obtained.

The target video frame is a video frame with the largest timestamp among currently obtained video frames;

S305: obtaining, from a target video file, a video frame having a timestamp corresponding to the second moment contained in the second jump instruction as a to-be-played video frame.

S306: inputting the obtained to-be-played video frames into a preset decoder, and decoding the to-be-played video frames by the preset decoder to obtain decoded to-be-played video frames.

S307: storing the decoded to-be-played video frames as texture data in a texture storage area of a graphic processing unit.

S308: determining, from the decoded to-be-played video frames stored in the texture storage area, a decoded to-be-played video frame that satisfies a rendering condition as a to-be-rendered video frame.

S309: rendering the determined to-be-rendered video frame by the graphic processing unit and playing the rendered video frame.

The above S306 is the same as S102 shown in FIG. 1, the above S307 is the same as S103 shown in FIG. 1, the above S308 is the same as S104 shown in FIG. 1, and the above S309 is the same as S105 shown in FIG. 1.

In one case, in the jump of video playing, that is, after receiving the second jump instruction, the preset decoder may lose useful frames. The useful frames correspond to the useless frames. The useful frames may refer to video frames that, in theory, are input into a preset decoder and needed to be decoded. The useful frames may be selectively discarded according to an instruction. For example, when the electronic device receives the first jump instruction, it may notify the preset decoder to discard currently obtained video frames. The above useless frames may refer to video frames that, in theory, are input into the preset decoder and may not be decoded.

In order to avoid the situation where the preset decoder loses useful frames, in the embodiment of the present application, useless video frames are constructed as useless frames and are cyclically input into the preset decoder, so as to facilitate decoding of currently obtained video frames by the preset decoder. Once a decoded useless video frame or a target video frame is obtained, the electronic devices stops inputting the constructed useless video frames into the preset decoder, and obtains the to-be-played video frames from the target video file.

In one implementation, the electronic device may determine that the second jump instruction is not received. In this case, the electronic device may play the target video file according to a normal video playing process. That is, to-be-played video frames are obtained from the target video file in a chronological order based on timestamps for all video frames.

In the embodiment of the present application, before the electronic device obtains a video frame to be played, the electronic device may further determine whether a jump instruction is received. A determination is then made as to whether the received jump instruction is a first jump instruction described above. When the received jump instruction is the first jump instruction, a video playing process corresponding to the first jump instruction is executed. When the received jump instruction is determined not to be the first jump instruction, a further determination may be made as to whether the received jump instruction is a second jump instruction described above. When the received jump instruction is the second jump instruction, a video playing process corresponding to the second jump instruction is executed. When the received jump instruction is not the second jump instruction, a normal video playing process is executed.

Alternatively, before obtaining to-be-played video frames, the electronic device may first determine whether a jump instruction is received. At this time, the electronic device may further determine whether the received jump instruction is a second jump instruction described above. When the received jump instruction is the second jump instruction, a video playing process corresponding to the second jump instruction is executed. When the received jump instruction is determined not to be the second jump instruction, a further determination may be made as to whether the received jump instruction is a first jump instruction described above. When the received jump instruction is the first jump instruction, a video playing process corresponding to the first jump instruction is executed. When the received jump instruction is not the first jump instruction, a normal video playing process is executed.

In one implementation, the operation of constructing a useless video frame as a useless frame may include:

obtaining a key video frame; and modifying a timestamp for the key video frame based on a timestamp for the target frame to obtain a useless video frame as the useless frame.

It may be understood that the key video frame may be an I frame in the video frames. The I frame may be any of the I frames in the target video file or any I frame in another video file. Embodiments are not limited in this aspect. After obtaining a key video frame, the electronic device may modify the timestamp for the key video frame based on the timestamp for the target frame. The target video frame is a video frame with the largest timestamp among video frames currently obtained by the preset decoder. Specifically, the above timestamp may include a presentation timestamp (PTS) and a decode timestamp (DTS).

The operation of modify the timestamp for the key video frame based on the timestamp for the target frame may include:

using a sum of a display timestamp for the target video frame and a first preset duration as a display timestamp of the key video frame;

using a sum of a decoding timestamp for the target video frame and a second preset duration as a decoding timestamp of the key video frame.

The first preset duration and the second preset duration are both preset durations, and the first preset duration and the second preset duration are both greater than 0. For example: a display timestamp for the above key video frame=a display timestamp for the target video frame+ptstheta, ptstheta>0; a decoding timestamp for the above key video frame=a decoding time for the target video frame+dtstheta, dtstheta>0. Therefore, the ptstheta may represent a first preset duration, and the dtstheta may represent a second preset duration.

In one implementation, during a video playing process, there may be two texture lists in the above texture storage area. One of the list may be used for storage of decoded to-be-played video frames, i.e., video frames for rendering, and thus may be referred to as to-be-rendered texture list. Another texture list may be used to store to-be-played video frames that have been used. Such video frames may be rendered video frames and/or skipped video frames. A skipped video frame is a video frame that do not need to be rendered, which can be determined based on a synchronization control principle of audio frames and video frames. This texture list may be referred to as a recovered texture list. The recovered texture list can be utilized in loop, that is, when the electronic device receives an instruction of a jump of video playing such as a backward playing and/or replay of a video file, corresponding video frames may be fetched directly from the recovered texture list. Computing resources of electronic device can thus be reduced during the video playing process.

Figure 4:
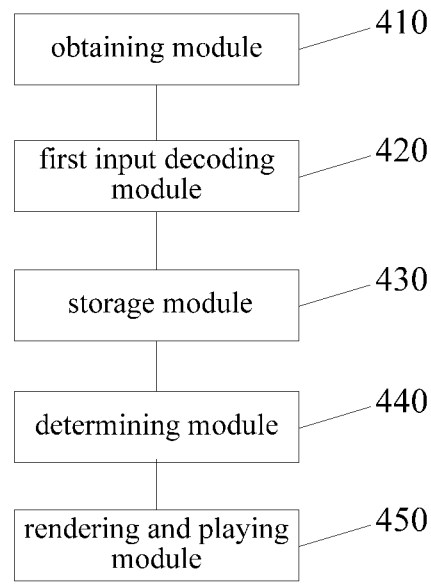
FIG. 4 is a schematic structural view of a video playing apparatus according to an embodiment of the present application.

Corresponding to the above method embodiments, an embodiment of the present application provides a video playing apparatus. As shown in FIG. 4, the apparatus includes an obtaining module 410, a first input decoding module 420, a storage module 430, a determining module 440, and a rendering and playing module 450.

The obtaining module 410 is configured for obtaining to-be-played video frames. The first input decoding module 420 is configured for inputting the obtained to-be-played video frames into a preset decoder, and decoding the to-be-played video frames by the preset decoder to obtain decoded to-be-played video frames.

The storage module 430 is configured for storing the decoded to-be-played video frames as texture data in a texture storage area of a graphic processing unit.

The determining module 440 is configured for determining, from the decoded to-be-played video frames stored in the texture storage area, a decoded to-be-played video frame that satisfies a rendering condition as a to-be-rendered video frame.

The rendering and playing module 450 is configured for rendering the determined to-be-rendered video frame by the graphic processing unit and playing the rendered video frame.

In the embodiment of the present application, decoded to-be-played video frames are stored as texture data in a texture storage area of a graphic processing unit. When a graphic processing unit is used to render the decoded to-be-played video frames, a decoded to-be-played video frame that satisfies a rendering condition can be obtained directly and locally from the graphic processing unit for rendering. It is thus not necessary to communicate with Random-Access Memory (RAM). As a result, more resources of the graphic processing unit may be used for rendering of video frames. This can improve somewhat the rendering speed and rendering efficiency for the graphic processing unit to render video frames during video playing process, thereby improving the video playing performance of the electronic device.

In addition, in the embodiment of the present application, decoded to-be-played video frames are directly stored as texture data in a texture storage area of a graphic processing unit instead of RAM. This saves RAM storage space and eliminates need for contention for RAM storage space with other running threads in the electronic device. This solves the problem that an electronic device with low memory shows degraded performance and insufficiency of RAM in playing and editing a video.

In one implementation, the rendering condition may be that, the decoded to-be-played video frame has the earliest timestamp among timestamps that are subsequent to a timestamp for an audio frame that is currently being played.

Figure 5:
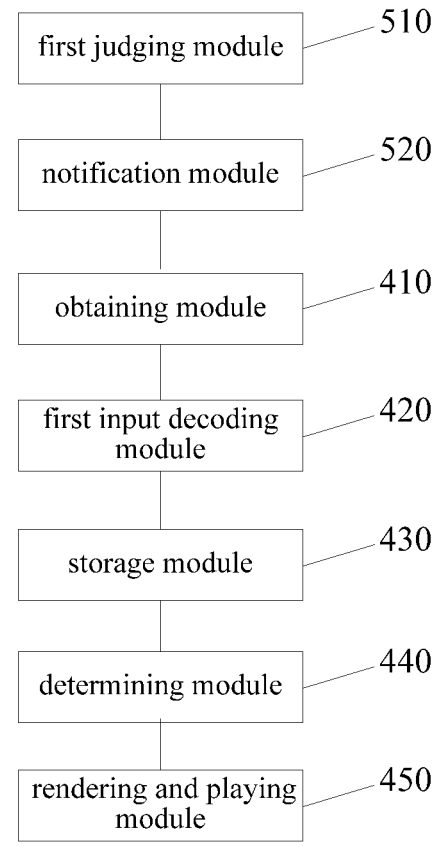
FIG. 5 is another schematic structural view of a video playing apparatus according to an embodiment of the present application.

In one implementation, as shown in FIG. 5, the apparatus may further include a first judging module 510 and a notification module 520.

The first judging module 510 is configured for, before obtaining to-be-played video frames, determining whether a first jump instruction is received, wherein the first jump instruction is an instruction for instructing a direct jump of video playing, and the first jump instruction contains a first moment to which the video playing is required to jump.

The notification module 520 is configured for notifying, when it is determined that the first jump instruction is received, notifying the preset decoder to discard currently obtained video frames.

After determining that the preset decoder has discarded the currently obtained video frames, the obtaining module 410 is further configured for:

obtaining, from a target video file, a video frame having a timestamp corresponding to the first moment contained in the first jump instruction as a to-be-played video frame.

In one implementation, when it is determined that the first jump instruction is not received, the obtaining module 410 is further configured for:

obtaining, from the target video file, to-be-played video frames in a chronological order based on timestamps for all video frames.

Figure 6:
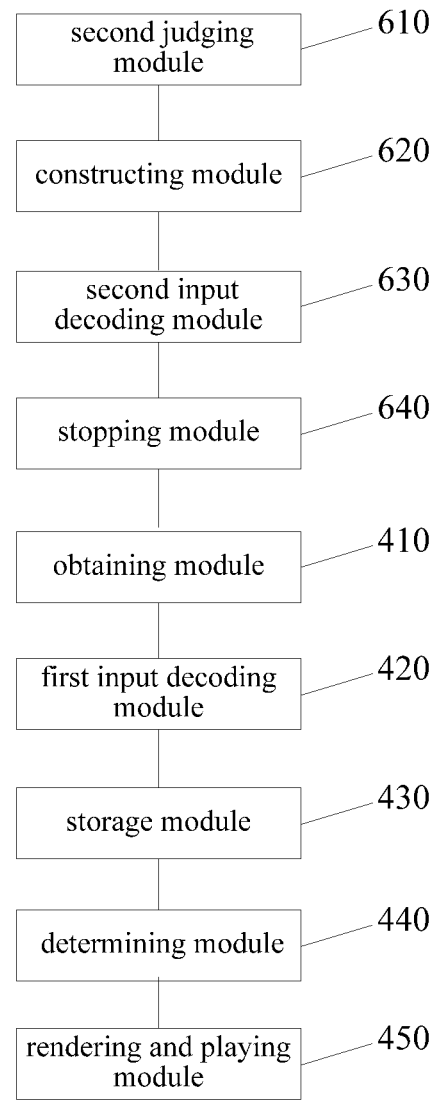
FIG. 6 is another schematic structural view of a video playing apparatus according to an embodiment of the present application.

In one implementation, as shown in FIG. 6, the apparatus may further include a second judging module 610, a constructing module 620, a second input decoding module 630 and a stopping module 640.

The second judging module 610 is configured for, before obtaining to-be-played video frames, determining whether a second jump instruction is received. The second jump instruction is an instruction for instructing the preset decoder to complete decoding of currently obtained video frames and then to perform a jump of video playing. The second jump instruction contains a second moment to which the video playing is required to jump.

The constructing module 620 is configured for constructing, after determining that the second jump instruction is received, a useless video frame as a useless frame.

The second input decoding module 630 is configured for inputting circularly the constructed useless video frame into the preset decoder, and decoding the currently obtained video frames and the useless video frame through the preset decoder.

The stopping module 640 is configured stopping the input of the constructed useless video frame into the preset decoder once a decoded useless video frame is obtained or a target video frame is obtained, wherein the target video frame is a video frame with the largest timestamp among the currently obtained video frames.

The obtaining module 410 is further configured for:

obtaining, from a target video file, a video frame having a timestamp corresponding to the second moment contained in the second jump instruction as a to-be-played video frame.

In one implementation, the constructing module 620 includes an obtaining unit and a modification constructing unit.

The obtaining unit is configured for obtaining a key video frame.

The modification constructing unit is configured for modifying a timestamp for the key video frame based on a timestamp for the target frame to obtain a useless video frame as the useless frame.

In one implementation, the timestamp includes a display timestamp and a decoding timestamp.

The modification constructing unit is further configured for:

using a sum of a display timestamp for the target video frame and a first preset duration as a display timestamp of the key video frame; and using a sum of a decoding timestamp for the target video frame and a second preset duration as a decoding timestamp of the key video frame.

Figure 7:
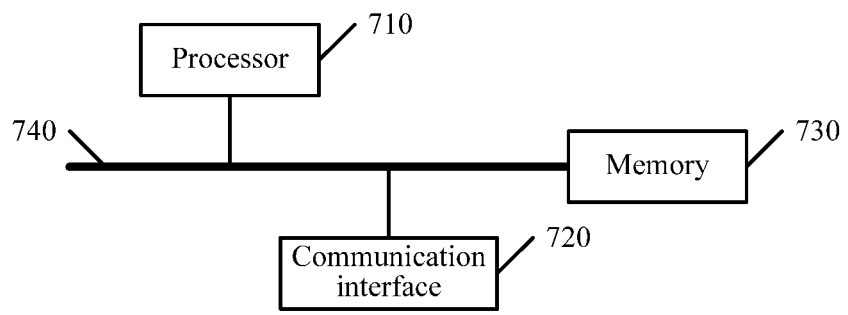
FIG. 7 is a schematic structural view of an electronic device according to an embodiment of the present application.

Corresponding to the above method embodiments, an embodiment of the present application provides an electronic device, as shown in FIG. 7, which includes a processor 710, a communication interface 720, a memory 730 and a communication bus 740, wherein the processor 710, the communication interface 720, and the memory 730 communicate with each other via the communication bus 740.

The memory 730 is configured for storing a computer program;

the processor 710 is configured for executing the computer program stored in the memory so as to implement a video playing method provided in embodiments of the present application. The video playing method may include the following operations:

obtaining to-be-played video frames;

inputting the obtained to-be-played video frames into a preset decoder, and decoding the to-be-played video frames by the preset decoder to obtain decoded to-be-played video frames;

storing the decoded to-be-played video frames as texture data in a texture storage area of a graphic processing unit;

determining, from the decoded to-be-played video frames stored in the texture storage area, a decoded to-be-played video frame that satisfies a rendering condition as a to-be-rendered video frame; and rendering the determined to-be-rendered video frame by the graphic processing unit and playing the rendered video frame.

In the embodiment of the present application, decoded to-be-played video frames are stored as texture data in a texture storage area of a graphic processing unit. When a graphic processing unit is used to render the decoded to-be-played video frames, a decoded to-be-played video frame that satisfies a rendering condition can be obtained directly and locally from the graphic processing unit for rendering. It is thus not necessary to communicate with Random-Access Memory (RAM). As a result, more resources of the graphic processing unit may be used for rendering of video frames. This can improve somewhat the rendering speed and rendering efficiency for the graphic processing unit to render video frames during video playing process, thereby improving the video playing performance of the electronic device.

In addition, in the embodiment of the present application, decoded to-be-played video frames are directly stored as texture data in a texture storage area of a graphic processing unit instead of RAM. This saves RAM storage space and eliminates need for contention for RAM storage space with other running threads in the electronic device. This solves the problem that an electronic device with low memory shows degraded performance and insufficiency of RAM in playing and editing a video.

In one implementation, the rendering condition may be that, a decoded to-be-played video frame has the earliest timestamp among timestamps that are subsequent to a timestamp for an audio frame that is currently being played.

In one implementation, before obtaining to-be-played video frames, the method further includes:

determining whether a first jump instruction is received, wherein the first jump instruction is an instruction for instructing a direct jump of video playing, and the first jump instruction contains a first moment to which the video playing is required to jump; and when it is determined that the first jump instruction is received, notifying the preset decoder to discard currently obtained video frames.

After determining that the preset decoder has discarded the currently obtained video frames, the operation of obtaining to-be-played video frames includes:

obtaining, from a target video file, a video frame having a timestamp corresponding to the first moment contained in the first jump instruction as a to-be-played video frame.

In one implementation, when it is determined that the first jump instruction is not received, the operation of obtaining to-be-played video frames includes:

obtaining, from the target video file, to-be-played video frames in a chronological order based on timestamps for all video frames.

In one implementation, before obtaining to-be-played video frames, the method further includes:

determining whether a second jump instruction is received, wherein the second jump instruction is an instruction for instructing the preset decoder to complete decoding of currently obtained video frames and then to perform a jump of video playing, and the second jump instruction contains a second moment to which the video playing is required to jump;

after determining that the second jump instruction is received, constructing a useless video frame as a useless frame;

inputting circularly the constructed useless video frame into the preset decoder, and decoding the currently obtained video frames and the useless video frame through the preset decoder; and stopping the input of the constructed useless video frame into the preset decoder once a decoded useless video frame is obtained or a target video frame is obtained, wherein the target video frame is a video frame with the largest timestamp among the currently obtained video frames.

The operation of obtaining to-be-played video frames includes:

obtaining, from a target video file, a video frame having a timestamp corresponding to the second moment contained in the second jump instruction as a to-be-played video frame.

In one implementation, constructing the useless video frames as useless frames includes:

obtaining a key video frame; and modifying a timestamp for the key video frame based on a timestamp for the target frame to obtain a useless video frame as the useless frame.

In one implementation, the timestamp includes a display timestamp and a decoding timestamp.

The operation of, modifying a timestamp for the key video frame based on a timestamp for the target frame to obtain a useless video frame as the useless frame includes:

using a sum of a display timestamp for the target video frame and a first preset duration as a display timestamp for the key video frame; and using a sum of a decoding timestamp for the target video frame and a second preset duration as a decoding timestamp for the key video frame.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure. However, this does not mean there is only one communication bus or one type of communication bus.

The communications interface is used for communication between the aforementioned electronic device and other devices.

The memory can include a random access memory (RAM), or a non-volatile memory (NVM), for example at least one disk memory. Optionally, the memory can also be at least one storage device remote from the processor described above.

The aforementioned processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

Corresponding to the above method embodiments, an embodiment of the present application provides a computer readable storage medium having a computer program stored thereon which, when executed by a processor, cause the processor to implement any one of operations of the video playing method provided in embodiments of the present application. The above video playing method may include the following operations:

obtaining to-be-played video frames;

inputting the obtained to-be-played video frames into a preset decoder, and decoding the to-be-played video frames by the preset decoder to obtain decoded to-be-played video frames;

storing the decoded to-be-played video frames as texture data in a texture storage area of a graphic processing unit;

determining, from the decoded to-be-played video frames stored in the texture storage area, a decoded to-be-played video frame that satisfies a rendering condition as a to-be-rendered video frame; and rendering the determined to-be-rendered video frame by the graphic processing unit and playing the rendered video frame.

In the embodiment of the present application, decoded to-be-played video frames are stored as texture data in a texture storage area of a graphic processing unit. When a graphic processing unit is used to render the decoded to-be-played video frames, a decoded to-be-played video frame that satisfies a rendering condition can be obtained directly and locally from the graphic processing unit for rendering. It is thus not necessary to communicate with Random-Access Memory (RAM). As a result, more resources of the graphic processing unit may be used for rendering of video frames. This can improve somewhat the rendering speed and rendering efficiency for the graphic processing unit to render video frames during video playing process, thereby improving the video playing performance of the electronic device.

In addition, in the embodiment of the present application, decoded to-be-played video frames are directly stored as texture data in a texture storage area of a graphic processing unit instead of RAM. This saves RAM storage space and eliminates need for contention for RAM storage space with other running threads in the electronic device. This solves the problem that an electronic device with low memory shows degraded performance and insufficiency of RAM in playing and editing a video.

In one implementation, the rendering condition may be that, a decoded to-be-played video frame has the earliest timestamp among timestamps that are subsequent to a timestamp for an audio frame that is currently being played.

In one implementation, before obtaining to-be-played video frames, the method further includes:

determining whether a first jump instruction is received, wherein the first jump instruction is an instruction for instructing a direct jump of video playing, and the first jump instruction contains a first moment to which the video playing is required to jump; and when it is determined that the first jump instruction is received, notifying the preset decoder to discard currently obtained video frames.

After determining that the preset decoder has discarded the currently obtained video frames, the operation of obtaining to-be-played video frames includes:

obtaining, from a target video file, a video frame having a timestamp corresponding to the first moment contained in the first jump instruction as a to-be-played video frame.

In one implementation, when it is determined that the first jump instruction is not received, the operation of obtaining to-be-played video frames includes:

obtaining, from the target video file, to-be-played video frames in a chronological order based on timestamps for all video frames.

In one implementation, before obtaining to-be-played video frames, the method further includes:

determining whether a second jump instruction is received, wherein the second jump instruction is an instruction for instructing the preset decoder to complete decoding of currently obtained video frames and then to perform a jump of video playing, and the second jump instruction contains a second moment to which the video playing is required to jump;

after determining that the second jump instruction is received, constructing a useless video frame as a useless frame;

inputting circularly the constructed useless video frame into the preset decoder, and decoding the currently obtained video frames and the useless video frame through the preset decoder; and stopping the input of the constructed useless video frame into the preset decoder once a decoded useless video frame is obtained or a target video frame is obtained, wherein the target video frame is a video frame with the largest timestamp among the currently obtained video frames.

The operation of obtaining to-be-played video frames includes:

obtaining, from a target video file, a video frame having a timestamp corresponding to the second moment contained in the second jump instruction as a to-be-played video frame.

In one implementation, constructing the useless video frames as useless frames includes:

obtaining a key video frame; and modifying a timestamp for the key video frame based on a timestamp for the target frame to obtain a useless video frame as the useless frame.

In one implementation, the timestamp includes a display timestamp and a decoding timestamp.

The operation of, modifying a timestamp for the key video frame based on a timestamp for the target frame to obtain a useless video frame as the useless frame includes:

using a sum of a display timestamp for the target video frame and a first preset duration as a display timestamp for the key video frame; and using a sum of a decoding timestamp for the target video frame and a second preset duration as a decoding timestamp for the key video frame.

Corresponding to the above method embodiments, an embodiment of the present application provides a computer program which, when executed by a processor, causes the processor to implement any one of operations of the video playing method provided in embodiments of the present application. The above video playing method may include the following operations:

obtaining to-be-played video frames;

inputting the obtained to-be-played video frames into a preset decoder, and decoding the to-be-played video frames by the preset decoder to obtain decoded to-be-played video frames;

storing the decoded to-be-played video frames as texture data in a texture storage area of a graphic processing unit;

determining, from the decoded to-be-played video frames stored in the texture storage area, a decoded to-be-played video frame that satisfies a rendering condition as a to-be-rendered video frame; and rendering the determined to-be-rendered video frame by the graphic processing unit and playing the rendered video frame.

In the embodiment of the present application, decoded to-be-played video frames are stored as texture data in a texture storage area of a graphic processing unit. When a graphic processing unit is used to render the decoded to-be-played video frames, a decoded to-be-played video frame that satisfies a rendering condition can be obtained directly and locally from the graphic processing unit for rendering. It is thus not necessary to communicate with Random-Access Memory (RAM). As a result, more resources of the graphic processing unit may be used for rendering of video frames. This can improve somewhat the rendering speed and rendering efficiency for the graphic processing unit to render video frames during video playing process, thereby improving the video playing performance of the electronic device.

In addition, in the embodiment of the present application, decoded to-be-played video frames are directly stored as texture data in a texture storage area of a graphic processing unit instead of RAM. This saves RAM storage space and eliminates need for contention for RAM storage space with other running threads in the electronic device. This solves the problem that an electronic device with low memory shows degraded performance and insufficiency of RAM in playing and editing a video.

In one implementation, the rendering condition may be that, a decoded to-be-played video frame has the earliest timestamp among timestamps that are subsequent to a timestamp for an audio frame that is currently being played.

In one implementation, before obtaining to-be-played video frames, the method further includes:

determining whether a first jump instruction is received, wherein the first jump instruction is an instruction for instructing a direct jump of video playing, and the first jump instruction contains a first moment to which the video playing is required to jump; and when it is determined that the first jump instruction is received, notifying the preset decoder to discard currently obtained video frames.

After determining that the preset decoder has discarded the currently obtained video frames, the operation of obtaining to-be-played video frames includes:

obtaining, from a target video file, a video frame having a timestamp corresponding to the first moment contained in the first jump instruction as a to-be-played video frame.

In one implementation, when it is determined that the first jump instruction is not received, the operation of obtaining to-be-played video frames includes:

obtaining, from the target video file, to-be-played video frames in a chronological order based on timestamps for all video frames.

In one implementation, before obtaining to-be-played video frames, the method further includes:

determining whether a second jump instruction is received, wherein the second jump instruction is an instruction for instructing the preset decoder to complete decoding of currently obtained video frames and then to perform a jump of video playing, and the second jump instruction contains a second moment to which the video playing is required to jump;

after determining that the second jump instruction is received, constructing a useless video frame as a useless frame;

inputting circularly the constructed useless video frame into the preset decoder, and decoding the currently obtained video frames and the useless video frame through the preset decoder; and stopping the input of the constructed useless video frame into the preset decoder once a decoded useless video frame is obtained or a target video frame is obtained, wherein the target video frame is a video frame with the largest timestamp among the currently obtained video frames.

The operation of obtaining to-be-played video frames includes:

obtaining, from a target video file, a video frame having a timestamp corresponding to the second moment contained in the second jump instruction as a to-be-played video frame.

In one implementation, constructing the useless video frames as useless frames includes:

obtaining a key video frame; and modifying a timestamp for the key video frame based on a timestamp for the target frame to obtain a useless video frame as the useless frame.

In one implementation, the timestamp includes a display timestamp and a decoding timestamp.

The operation of modifying a timestamp for the key video frame based on a timestamp for the target frame to obtain a useless video frame as the useless frame includes:

using a sum of a display timestamp for the target video frame and a first preset duration as a display timestamp for the key video frame; and using a sum of a decoding timestamp for the target video frame and a second preset duration as a decoding timestamp for the key video frame.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "include" or any other variants thereof are intended to cover non-exclusive inclusions, so that processes, methods, articles or devices including a series of elements include not only those elements listed but also those not further listed or the elements intrinsic to these processes, methods, articles, or devices. Without further limitations, elements defined by the sentences "include(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. For embodiments of the apparatus, device, storage medium and computer programs, since they are similar to the embodiments of the method, the description thereof is relatively simple; the relating parts could refer to the parts of the description of embodiments of the method.

The embodiments described above are merely preferred embodiments of the present application, and not intended to limit the scope of the present application. Any modifications, equivalents, improvements or the like within the spirit and principle of the application should be included in the scope of the application.

What is claimed is:

1. A video playing method, comprising:
    obtaining to-be-played video frames;
    inputting the obtained to-be-played video frames into a preset decoder, and decoding the to-be-played video frames by the preset decoder to obtain decoded to-be-played video frames;
    storing the decoded to-be-played video frames as texture data in a local texture storage area of a graphic processing unit;
    determining, from the decoded to-be-played video frames stored in the texture storage area, a decoded to-be-played video frame that satisfies a rendering condition as a to-be-rendered video frame; and
    rendering the determined to-be-rendered video frame by the graphic processing unit and playing a rendered video frame;
    wherein, the rendering condition is that, the decoded to-be-played video frame has an earliest timestamp among timestamps that are subsequent to a timestamp for an audio frame that is currently being played, and
    wherein, before obtaining to-be-played video frames, the method further comprises:
    determining whether a second jump instruction is received, wherein the second jump instruction is an instruction for instructing the preset decoder to complete decoding of currently obtained video frames and then to perform a jump of video playing, and the second jump instruction contains a second moment to which the video playing is required to jump;
    after determining that the second jump instruction is received, constructing a useless video frame as a useless frame;
    inputting circularly the constructed useless video frame into the preset decoder, and decoding the currently obtained video frames and the useless video frame through the preset decoder; and
    stopping the input of the constructed useless video frame into the preset decoder once a decoded useless video frame is obtained or a target video frame is obtained, wherein the target video frame is a video frame with the largest timestamp among the currently obtained video frames;
    wherein, obtaining to-be-played video frames comprises:
    obtaining, from a target video file, a video frame having a timestamp corresponding to the second moment contained in the second jump instruction as a to-be-played video frame.

2. The method of claim 1, wherein, before obtaining to-be-played video frames, the method further comprises:
    determining whether a first jump instruction is received, wherein the first jump instruction is an instruction for instructing a direct jump of video playing, and the first jump instruction contains a first moment to which the video playing is required to jump; and
    when it is determined that the first jump instruction is received, notifying the preset decoder to discard currently obtained video frames;
    after determining that the preset decoder has discarded the currently obtained video frames, the operation of obtaining to-be-played video frames comprises:
    obtaining, from a target video file, a video frame having a timestamp corresponding to the first moment contained in the first jump instruction as a to-be-played video frame.

3. The method of claim 2, wherein, when it is determined that the first jump instruction is not received, obtaining to-be-played video frames comprises:
    obtaining, from the target video file, to-be-played video frames in a chronological order based on timestamps for all video frames.

4. The method of claim 1, wherein, constructing a useless video frame as a useless frame comprises:
    obtaining a key video frame; and modifying a timestamp for the key video frame based on a timestamp for the target frame to obtain a useless video frame as the useless frame.

5. The method of claim 4, wherein, the timestamp comprises a display timestamp and a decoding timestamp;
    wherein, modifying a timestamp for the key video frame based on a timestamp for the target frame to obtain a useless video frame as the useless frame comprises:
    using a sum of a display timestamp for the target video frame and a first preset duration as a display timestamp for the key video frame;
    using a sum of a decoding timestamp for the target video frame and a second preset duration as a decoding timestamp for the key video frame.

6. An electronic device comprising a processor, a communication interface, a memory, a communication bus and a display, wherein the processor, the communication interface, the memory, and the display communicate with each other via the communication bus;
    the memory is configured for storing a computer program; and
    the processor is configured for executing the computer program stored in the memory so as to implement the video playing method of claim 1;
    the display is configured for displaying rendered video frames.

7. A non-transitory computer readable storage medium having a computer program stored thereon which, when executed by a processor, causes the processor to implement the video playing method of claim 1.

8. A video playing apparatus, comprising:
    an obtaining module, configured for obtaining to-be-played video frames;
    a first input decoding module, configured for inputting the obtained to-be-played video frames into a preset decoder, and decoding the to-be-played video frames by the preset decoder to obtain decoded to-be-played video frames;
    a storage module, configured for storing the decoded to-be-played video frames as texture data in a local texture storage area of a graphic processing unit;
    a determining module, configured for determining, from the decoded to-be-played video frames stored in the texture storage area, a decoded to-be-played video frame that satisfies a rendering condition as a to-be-rendered video frame;
    a rendering and playing module, configured for rendering the determined to-be-rendered video frame by the graphic processing unit and playing a rendered video frame;
    wherein, the rendering condition is that, the decoded to-be-played video frame has an earliest timestamp among timestamps that are subsequent to a timestamp for an audio frame that is currently being played, wherein, the apparatus further comprises a second judging module, a constructing module, a second input decoding module, and a stopping module;

wherein:

the second judging module is configured for, before obtaining to-be-played video frames, determining whether a second jump instruction is received, wherein the second jump instruction is an instruction for instructing the preset decoder to complete decoding of currently obtained video frames and then to perform a jump of video playing, and the second jump instruction contains a second moment to which the video playing is required to jump;

the constructing module is configured for constructing, after determining that the second jump instruction is received, a useless video frame as a useless frame;

the second input decoding module is configured for inputting circularly the constructed useless video frame into the preset decoder, and decoding the currently obtained video frames and the useless video frame through the preset decoder; and the stopping module is configured for stopping the input of the constructed useless video frame into the preset decoder once a decoded useless video frame is obtained or a target video frame is obtained, wherein the target video frame is a video frame with the largest timestamp among the currently obtained video frames; and the obtaining module is further configured for:

obtaining, from a target video file, a video frame having a timestamp corresponding to the second moment contained in the second jump instruction as a to-be-played video frame.

9. The apparatus of claim 8, wherein, the apparatus further comprises a first judging module and a notification module;

the first judging module is configured for, before obtaining to-be-played video frames, determining whether a first jump instruction is received, wherein the first jump instruction is an instruction for instructing a direct jump of video playing, and the first jump instruction contains a first moment to which the video playing is required to jump; and the notification module is configured for notifying, when it is determined that the first jump instruction is received, notifying the preset decoder to discard currently obtained video frames;

after determining that the preset decoder has discarded the currently obtained video frames, the obtaining module is further configured for:

obtaining, from a target video file, a video frame having a timestamp corresponding to the first moment contained in the first jump instruction as a to-be-played video frame.

10. The apparatus of claim 9, wherein, when it is determined that the first jump instruction is not received, the obtaining module is further configured for:

obtaining, from the target video file, to-be-played video frames in a chronological order based on timestamps for all video frames.

11. The apparatus of claim 8, wherein, the constructing module comprises a obtaining unit and a modification constructing unit;

the obtaining unit is configured for obtaining a key video frame;

the modification constructing unit is configured for modifying a timestamp for the key video frame based on a timestamp for the target frame to obtain a useless video frame as the useless frame.

12. The apparatus of claim 11, wherein, the timestamp comprises a display timestamp and a decoding timestamp;

the modification constructing unit is further configured for:

using a sum of a display timestamp for the target video frame and a first preset duration as a display timestamp of the key video frame; and using a sum of a decoding timestamp for the target video frame and a second preset duration as a decoding timestamp of the key video frame.

* * * * *